United States Patent [19]
Suwa

[11] Patent Number: 6,161,463
[45] Date of Patent: Dec. 19, 2000

[54] NEGATIVE PRESSURE BOOSTER EQUIPPED WITH ELECTROMAGNETIC AUXILLARY CONTROL

[75] Inventor: Toshiyuki Suwa, Nagano, Japan

[73] Assignee: Nissin Kogyo Co., Ltd., Nagano, Japan

[21] Appl. No.: 09/195,210

[22] Filed: Nov. 18, 1998

[30] Foreign Application Priority Data

Jan. 23, 1998 [JP] Japan .................................. 10-011783

[51] Int. Cl.$^7$ .................................. F15B 9/03; F15B 9/10
[52] U.S. Cl. .................................................. 91/367
[58] Field of Search .................................. 91/367, 376 R

[56] References Cited

U.S. PATENT DOCUMENTS

| | | | |
|---|---|---|---|
| 5,096,267 | 3/1992 | Volz | 91/367 |
| 5,483,866 | 1/1996 | Schluter | 91/367 |
| 5,711,202 | 1/1998 | Tsubouchi | 91/367 |
| 5,845,556 | 12/1998 | Tsubouchi et al. | 91/367 |

FOREIGN PATENT DOCUMENTS 7-251733  10/1995  Japan .

*Primary Examiner*—F. Daniel Lopez
*Attorney, Agent, or Firm*—McGuireWoods LLP

[57] ABSTRACT

A negative pressure booster equipped with an electromagnetic auxiliary control means can introduce air into an operation chamber in correspondence with normal braking and urgent braking by a single valve element which is simple in structure and provides good response. A valve element is supported for to-and-fro movement within a prescribed stroke in the input member and spring-biased to the side of the retraction limit. A solenoid and fixed core of an electromagnetic auxiliary control means is fixed to the valve cylinder coupled with booster pistons. A movable core opposite to the fixed core is coupled with the valve element. When the solenoid is excited while the input member advances, the movable core is operated so that the advancement quantity (communication opening degree between the operation chambers and air) of the valve element for the valve cylinder exceeds that of the valve element operated by the input member.

16 Claims, 3 Drawing Sheets

NEGATIVE PRESSURE BOOSTER EQUIPPED WITH ELECTROMAGNETIC AUXILLARY CONTROL

BACKGROUND OF THE INVENTION

1. Field of the Invention

The present invention generally relates to a negative pressure booster used for a toggle operation of a brake master cylinder of a motor vehicle. More particularly, the present invention relates to an improvement of a negative pressure booster equipped with an electromagnetic auxiliary control means, including a booster shell, a booster piston which is accommodated in the booster shell and partitions the inside thereof into a front negative pressure chamber communicating with a negative pressure source and a rear operation chamber, and a valve cylinder slidably supported on the rear wall of the booster shell and connected to the booster piston, wherein within the valve cylinder are arranged an input member movable to-and-fro, a control valve for communicating the operation chamber with the negative pressure chamber or air in accordance with the to-and-fro movement of the input member and an electromagnetic auxiliary control means for increasing the operation quantity of the control valve when it is excited while the input member advances.

2. Background Description

Laid open Japanese application JP-A-7-251733 discloses a negative booster equipped with an electromagnetic auxiliary control which operates the electromagnetic auxiliary control means at the time of urgent braking to increase the operation quantity of a control valve so that a large quantity of air is swiftly introduced into the operation chamber, thereby permitting an output rod to provide a high output to a toggle limit. The negative pressure booster disclosed in the above publication is provided with valve elements for introducing air into the operation chambers; i.e., a first valve element fixed to the input member and a second valve element coupled with the electromagnetic auxiliary control means. At the time of normal braking, as the input member advances, the second valve element opens after the first valve element opens completely.

In the negative pressure booster disclosed in the above publication, the quantity of advancement of the input member until the first valve element completely opens means an invalid stroke. In operation, a time delay occurs from when the input member starts to advance to when air is introduced into the operation chamber to operate a booster piston. Also, because of provision of two valve elements for air introduction, a large number of components are required, thus leading to complexity of the structure of the booster.

SUMMARY OF THE INVENTION

It is therefore an object of the present invention to provide a negative-pressure booster equipped with an electromagnetic auxiliary control means which is both simpler in construction and provides better operation response than the prior art.

In order to attain the above object, in a negative pressure booster equipped with an electromagnetic auxiliary control means wherein, within a booster shell, are accommodated booster pistons which partition the inside into front negative pressure chambers communicating with a negative pressure source and rear operation chambers. A valve cylinder, slidably supported on the rear wall of the booster shell, is connected to booster pistons. Within the valve cylinder are arranged an input member movable to-and-fro, a control valve for switching communication of the operation chambers with the negative pressure chambers and with air and an electromagnetic auxiliary control means for increasing an operation quantity of the control valve when it is excited while the input member advances.

The first feature of the present invention resides in that the control valve has a valve element which is supported movably to-and-fro within a prescribed stroke to the input member and spring-biased to the side of the retreating limit thereof. When the valve element advances toward the valve cylinder, the control valve interrupts communication between the operation chambers and the negative pressure chambers to increase the communication opening degree between the operation chambers and air in accordance with the degree of advancement. When the valve element retreats from the valve cylinder, the control valve interrupts communication between the operation chambers and air to increase the communication opening degree between the operation chambers and negative pressure chambers in accordance with the degree of retreat. Further, the electromagnetic auxiliary control means includes a fixed core fixed to the valve cylinder, a solenoid mounted on the fixed core and movable core coupled with the valve element to be opposite to the fixed core. When the solenoid is excited while the input member advances, the electromagnetic auxiliary control means operates the movable core so that the advancement quantity of the valve element for the valve cylinder exceeds that of the valve element by the input member.

In accordance with the first feature, a single valve element permits introduction of air into the operation chamber to be controlled in response to the normal braking and urgent braking. Further, the valve element does not provide an invalid stroke.

The second feature of the present invention resides in that between the fixed core and movable core, a gap is provided which impedes the movable core from being operated even when the solenoid is excited when the input member is located at the retreating limit for the valve cylinder and the valve element is located at the retreating limit for the input member.

In accordance with the second feature of the present invention, even if the solenoid is excited because of any failure while the input member is not operative, the movable core is not attracted to the fixed core so that erroneous operation of the valve element is prevented.

The third feature of the present invention resides in that the input member is connected to the input returning spring which provides a spring force capable of separating the movable core from the fixed core through the input member even in a state where the solenoid is excited.

In accordance with the third feature, when the input member is retracted from the urgent braking state, even if the excitation of the solenoid is not canceled because of any failure, the movable core is retracted by the input return spring force to the position where the attraction force for the fixed core and movable core is invalidated. At the same time, the valve element is retreated to communicate the operation chambers with the negative pressure chambers, thereby canceling the operation of the booster piston.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
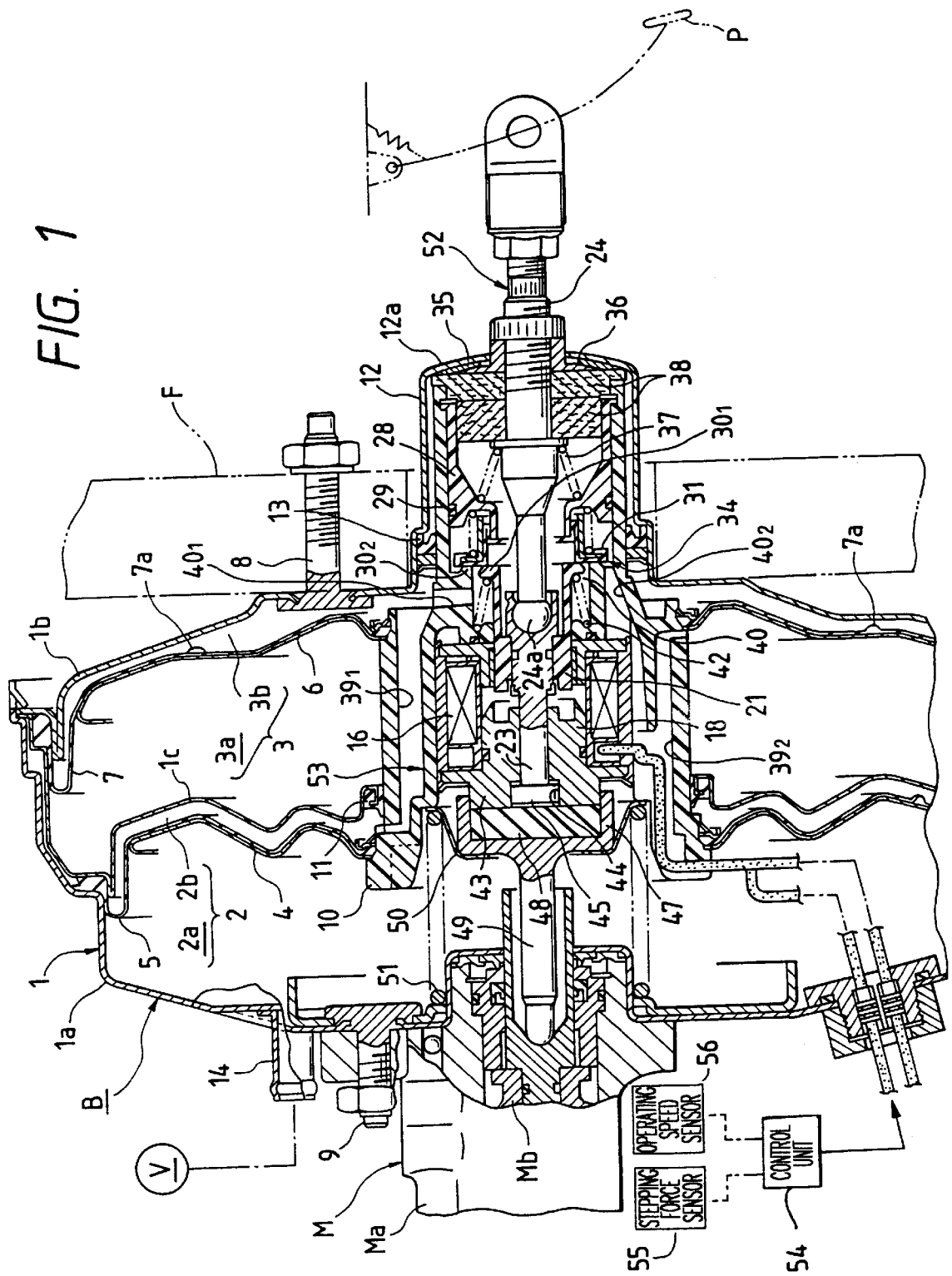
FIG. 1 is a longitudinal sectional view of a negative pressure booster equipped with an electromagnetic auxiliary control means according to an embodiment of the present invention.
Figure 2:
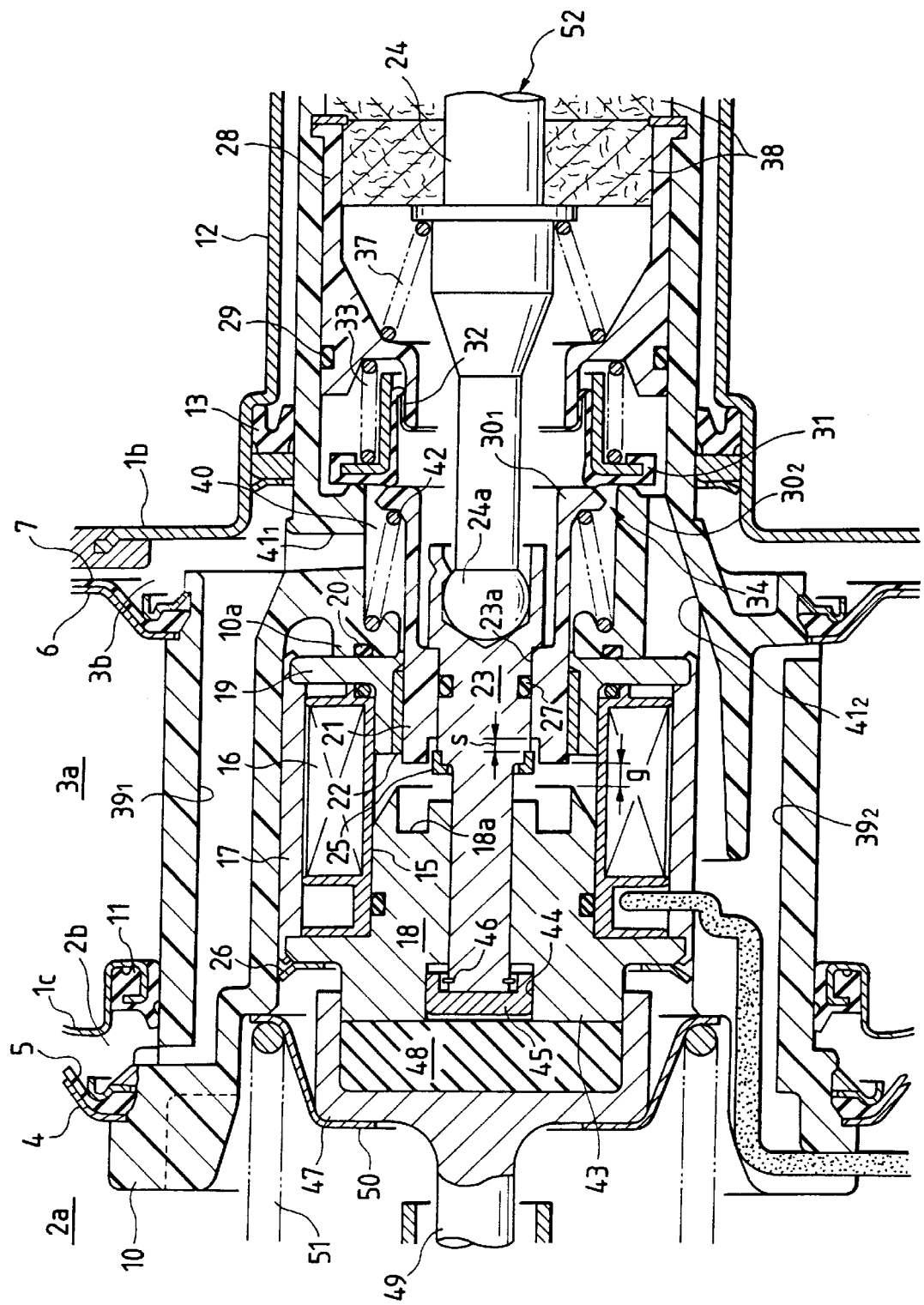
FIG. 2 is an enlarged view of the main part of FIG. 1.
Figure 3:
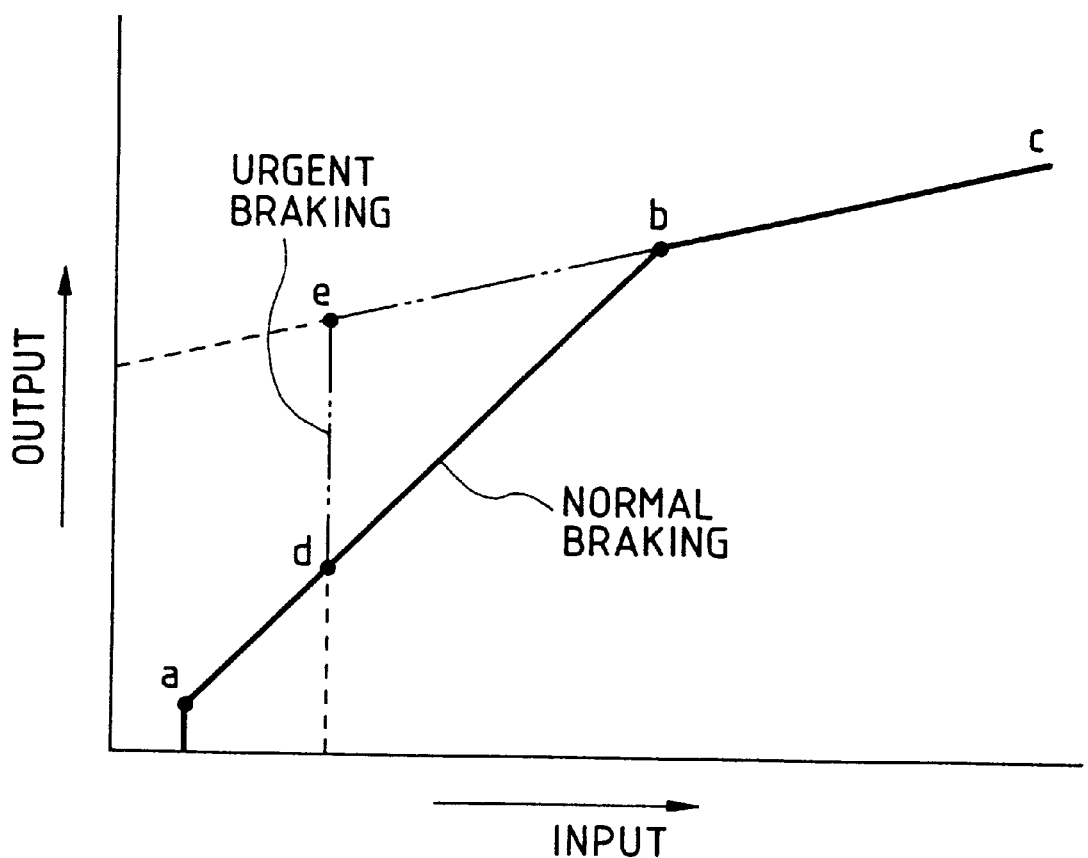
FIG. 3 is a graph showing a characteristic of the negative pressure booster.

Referring now to the drawings, an explanation will be given of an embodiment of the present invention. FIG. 1 shows a tandem-type negative pressure booster equipped with an electromagnetic auxiliary control means according to an embodiment of the invention. FIG. 2 is an enlarged view of the main part of FIG. 1. FIG. 3 is a graph showing the characteristic of the negative-pressure booster.

In FIGS. 1 and 2, a booster shell 1 for a negative-pressure booster B includes a pair of front and rear hemispheres 1a and 1b, whose opposite ends are coupled with each other, and a partition plate 1c sandwiched between both shell hemispheres 1a and 1b to partition the inside of the booster shell 1 into a front shell chamber 2 and a rear shell chamber 3. The rear shell hemisphere 1b is fixed to the front wall F of a vehicle chamber by a bolt 8. A cylinder body Ma of a brake master cylinder M which is operated by the booster B is fixed to the front shell hemisphere 1a.

The front shell chamber 2 is partitioned into a front negative-pressure chamber 2a on the front side and a front operation chamber 2b on the rear side by a front booster piston 4, which is mounted for reciprocal to-and-fro movement within the front shell chamber, and a front diaphragm 5, which is coupled with the front booster piston 4 so as to overlap its rear face and sandwiched between the front shell hemisphere 1a and partition wall 1c. The front negative pressure chamber 2a is connected to a negative pressure source V (e.g., the inside of an intake manifold of an internal combustion engine) through a negative pressure introducing tube 14.

The front shell chamber 3 is partitioned into a rear negative-pressure chamber 3a on the front side and a rear operation chamber 3b on the rear side by a rear booster piston 6, which is mounted for reciprocal to-and-fro movement within the rear shell chamber 3, and a rear diaphragm 7, which is coupled with the front booster piston 4 so as to overlap its rear face and sandwiched between both hemisphere 1a and 1b together with the partition plate 1c.

The front and rear booster pistons 4 and 6 are ring-shaped and made of a steel plate. They are coupled with each other by a valve cylinder 10 of synthetic resin fixed at the center position thereof. The valve cylinder 10 is slidably supported to the partition plate 1c though a sealing member 11 and slidably supported by a rear extending tube 12 formed centrally of the rear shell hemisphere 1b through a sealing member 13. The retraction limit of both booster pistons 4 and 6 is defined when a number of protrusions 7a formed on the rear face of the rear diaphragm 7 are brought into contact with the rear wall of the booster shell 1.

A magnetic ring-shaped housing 17 for housing a solenoid 16 wound around a bobbin 15 is fit onto the inner peripheral surface of the front half of a valve cylinder 10. A cylindrical fixed core 18 fitting in the inner peripheral surface of the bobbin 15 is fixed at the end of the housing 17 by caulking. A cylindrical yoke 19 fitting on the rear half is fixed on the rear end of the housing 17 by caulking so that it is opposite to the fixed core 18 apart therefrom by a predetermined interval. An engagement ring 26 which presses the front surface of the front face of the outer periphery of the fixed core 18 is engaged with the inner peripheral surface of the valve cylinder 10. Thus, the housing 17 is held in a state where the yoke 19 is brought into contact with the intermediate partition wall 10a of the valve cylinder 10 through an O-ring 20.

A cylindrical movable core 21 is slidably fit in the inner peripheral surface of the yoke 19 through a sleeve 22. A valve plunger 23 is slidably fit in the inner peripheral surface of the movable core 21. To the rear end of the valve plunger 23, the spherical end 24a of an input rod 24, which intrudes into the valve cylinder 10 of the rear extending cylinder 12, is coupled for oscillating movement. The input rod 24 is operated by a braking pedal P coupled with the rear end thereof.

In a valve plunger 23, opposite ring-shaped steps 23a are formed at the rear end of the movable core 21. Opposite stopper rings 25 are fixed to the front end of the movable core 21 by press-fitting. Thus, the sliding stroke for the valve plunger 23 of the movable core 21 is limited to a certain value s.

In the movable core 21, a first ring-shaped washer $30_1$ (valve element) is integrally formed which passes through the intermediate partition 10a. A second valve seat $30_2$ is formed integrally to the valve cylinder 10 to surround the first valve seat $30_1$. A ring-shaped valve seat 31 opposite to both valve seat $30_1$ and $30_2$ is arranged in the valve seat 10. The valve seat 31 is movable to-and-fro and coupled with a cylindrical valve holder 28, which is fixedly fit in the rear inner peripheral surface of the valve cylinder 28 through an O-ring 29, through a seal diaphragm 32. The valve element 31 is biased toward both valve seats $30_1$ and $30_2$ by a valve spring 33 supported by the holder 28.

To the rear end of the rear extending cylinder 12, an inward flange 12a with an air introducing inlet 35 opened centrally is integrally formed. In contact with the inside of the flange 12a, a stopper plate 36 for defining the retraction limit of the input rod 24 is fixed adjustably in a to-and-fro direction. The input rod 24 is urged toward the retraction limit by an input return spring 37 which is supported by a valve holder 28.

On the inner periphery of the rear end of the valve cylinder 10, an air filter 38 is mounted. Through the air filter 38, the inner periphery of the first valve seat $30_1$ is always communicated with the air introducing inlet 35. The air filter 38 has flexibility so that the to-and-fro movement of the input rod 24 with respect to the valve cylinder 10 is not impeded.

The valve cylinder 10 includes a first communicating path $39_1$ communicating the front and rear operation chambers 2b and 3b, a second communicating path $39_2$ communicating the front and rear negative pressure chambers 2a and 3a, a first port $41_1$ communicating the first communicating passage $39_1$ with the circular passage 40 between the first and second valve seat $30_1$ and $30_2$ and a second port $41_2$ communicating the second communicating path $39_2$ with the outer periphery of the second valve seat $30_2$.

The first valve seat $30_1$ is urged rearward by a valve seat return spring 42 supported by the intermediate partition wall 10a of the valve cylinder 10. The spring force is set at a magnitude larger than that of the valve spring 33 for biasing the valve element 31 forward. Therefore, the movable core 21 is generally held at the retraction limit after sliding where it is brought into contact with the ring-shaped step 23a of the valve plunger 23 by the spring force of the valve return spring 42. At this time, a prescribed gap g is defined between the fixed and movable cores 18 and 21. The gap g is set at a magnitude sufficient to invalidate the attracting force which is generated in both cores 18 and 21 even when the solenoid 16 is excited. The movable core 21, as long as the fixed core 18 does not approach the fixed core 18, is not attracted to the fixed core 18 even when the solenoid 16 is excited. On the rear end surface of the fixed core 18, a ring-shaped concave portion 18a, which receives the front end when the movable core 21 is attracted, is formed.

The front end of the fixed core 18 is formed in the first piston 43. A second piston 45 having a reduced diameter smaller than the first piston 43 is slidably fit in a cylinder hole 44 having a bottom, which is formed at the center of the first piston 43 and opens against its front face. The front end of the valve plunger 23, which penetrates slidably in the center of the fixed core 18, is brought into contact with the rear end face of the second piston 45. A stopper ring 46, which is in contact with the bottom of a cylinder 44 to define the retraction limit of the valve plunger 23 for the fixed core 18, is engaged with the valve plunger 23.

A cup 47 is slidably fit on the outer periphery of the first piston 43. In the cup 47, a flat elastic piston 48 opposite to the first and second pistons 43, 45 is inserted.

An output rod 49 protrudes from the front end of the cup 47. The output rod 49 is connected to a piston Mb of the braking master cylinder M. A retainer 50, which contacts the front end face of the cup 47, retains the cup 47 within the valve cylinder 10. A valve cylinder spring 51 is retained in a compressed state between the retainer 50 and the booster shell 1.

In the configuration described above, the input rod 24 and valve plunger 23 constitute an input member 52. The valve element 31, valve spring 33, first valve seat $30_1$ and second valve seat $30_2$ constitute a control valve 34. The housing 17, solenoid 16, fixed core 18 and movable core 21 constitute an electromagnetic auxiliary control means 53. A control unit 54 is connected to a control electromagnetic auxiliary control means 53 for controlling the current flow therethrough.

A stepping force sensor 55 detects when a stepping force for the braking pedal P by a driver exceeds a prescribed value. An operation speed sensor 56 detects when the advancing speed of the input rod 24 exceeds a prescribed value. The signals detected by the stepping force sensor 55 and the operation speed sensor 56 are supplied to the input side of the control unit 54. Thus, when the control unit 54 receives one of the detected signals from the sensors 55, 56, it decides whether an urgent braking condition exists so that the solenoid 16 is supplied with a current for its excitation.

An explanation will be given of an operation of the embodiment. First, in a quiescent state, the negative pressure booster B, as shown in FIG. 1, the input rod 24 is located at the retraction limit. The control valve 34 is in a neutral state where the valve is seated on the first and second valve seats $30_1$, $30_2$ so that both front and rear operation chambers 2b and 3b are not communicated with any of both negative pressure chambers 2a, 3a and air introducing inlet 35. By control valve 34, a negative pressure from a negative pressure source, which is supplied through a negative pressure introducing tube 14, is stored. The negative pressure which is suitably diluted with air is held in both operation chambers 2b, 3b. Thus, a small advancing force, which is produced between the front negative pressure chamber 2a and operation chamber 2b and between the rear negative pressure chamber 3a and operation chamber 3b, is given to the front and rear booster pistons 4, 6. The advancing force and the force of the valve cylinder spring 42 are balanced so that both booster pistons 4 and 6 stop at a position advanced slightly from the retraction limit.

Now it is assumed that a driver steps on the braking pedal P to brake the vehicle to advance the first valve seat $30_1$ through the input driver 24 and the plunger 23. Initially, since both booster pistons 4 and 6 are immovable, the first valve seat $30_1$ leaves from the valve seat 31 so that the first port $41_1$ is communicated with the air introducing inlet 35 through the ring-shaped communication path 40. As a result, the air having flowed from the air introducing inlet 35 into the valve cylinder 10 passes the first valve seat $30_1$, and swiftly introduced into both operation chambers 2b, 3b via the first port $41_1$. Thus, the pressure in both negative pressure chambers 2a, 3a is boosted. A great forward thrust based on the pressure difference therebetween is obtained. As a result, together with the valve cylinder 10 and first piston 43, both booster pistons 4 and 6 advance with good response against the force of the valve returning spring 51. The first piston 43 pushes the cup 47; i.e., output rod 49 moves forward through the elastic piston 48 to drive the piston Mb of the braking master cylinder M. Accordingly, the braking master cylinder M respondes to stepping on of the braking pedal P without delay so that the vehicle can be braked.

Meanwhile, during the braking, the thrust force of both booster pistons 4, 6 applied to the first piston 43 and stepping force by a driver applied to the second piston 45 from the input rod 24 act on the rear end of the elastic piston 48. The operation counter force for the output rod 49 acts on the front end of the elastic piston 48. The elastic piston 4 is deflected to-and-fro. As a result, a part of the operation counter force from the output rod 49 is transmitted to the input rod 24 through the elastic piston 48. The driver can perceive the output from the output rod 49; i.e., the magnitude of the braking force.

Thus, until the output from the output rod 49 reaches the toggle limiting point (line a–b in FIG. 3), the valve cylinder 10 integral to the booster pistons 4, 6 advances by a advancing quantity of the input rod 24. When the input rod 24 stops to advance, the valve element 31 which has advanced together with the valve cylinder 10 is seated again on the first valve seat $30_1$ so that the further introduction of air into the operation chambers 2b, 3b is impeded. Thus, the advancement of the booster pistons 4, 6 is stopped to provide the toggle output corresponding to the input.

When the output from the output rod 49 exceeds the toggle limiting piston (line b–c in FIG. 3), the thrust due to the air pressure difference between the booster pistons 4 and 6 becomes maximum so that the first valve seat $30_1$ remains separated from the valve element 31. Therefore, the output from the output rod 49 is a sum of the maximum thrust due to the air pressure difference between the booster pistons 4 and 6 and the thrust of the input rod 24 due to the stepping force for the braking pedal P.

At the time of urgent braking when the stepping force sensor 55 and/or operation speed sensor 56 produce the detected signals, the control unit 54, when it receives the detected signals, excites the solenoid 16 to give magnetic force to the movable cores 18, 21. In this case, by the advancement of the input rod 24, valve plunger 23 and movable core 21 due to the stepping of the braking pedal P, the gap g between the fixed core and the movable core 18 and 21 has been closed so that the magnetic force between the fixed and movable cores 18 and 21 serves as efficient attraction force. Thus, the movable core 21 is attracted to the fixed core 18 to advance on the valve plunger 23 against the force of the valve seat returning spring 42 by a prescribed stroke s. This continues to separate the first valve seat 30₁ from the valve element 31 greatly. As a result, the air which has flowed from the air introducing inlet 45 passes smoothly the first valve seat 30₁ to fill both operation chambers 2b and 3b. Accordingly, as indicated by line d–e of FIG. 3, the output from the output rod 49 rises instantaneously to the toggle limiting point so that the piston Mb of the master cylinder M is driven at a high speed and strongly to respond to the urgent braking.

When the stepping force for the braking pedal P is released from the urgent braking state, even where the current flow through the solenoid 16 is continued because of any failure, if the input rod 24 and valve plunger 23 are retracted by the force of the input return spring 37, the movable core 21 can be forcibly separated from the fixed core 18 through the stopper ring 25. Then, the first valve seat 30₁, while it is held in contact with the ring-shaped step 23a of the valve plunger 23 by the force of the valve returning spring 42, is retracted together with the valve plunger 23 so that it is seated on the valve element 31 and separates the valve element 31 from the second valve seat 30₂. Thus, both operation chambers 2b, 3b are communicated with both negative pressure chambers 2a, 3a through the second port 41₂ and second valve seat 30₂. As a result, introduction of air into both operation chambers 2b, 3b is impeded, whereas the air in both operation chambers is attracted to the negative pressure source V through both negative pressure chambers 2a, 3a. In this case, since the air pressure difference is eliminated, the booster pistons 4, 6 are retracted by the force of the valve returning cylinder 51 to release the operation of the master cylinder M gradually.

When the input rod 24 retreats to the retreating limit where the stopper plate 36 is brought into contact with the inward flange 12a of the rearward extending cylinder 12, the rear booster piston 6 once returns to the retreating limit where the protrusion 7a of the rear diaphragm 7 is brought into contact with the rear wall of the booster shell 1. Now, the rear booster piston 6 seats the second valve seat 30₂ on the valve element 31 and separates the valve element 31 from the first valve seat 30₁. Thus, air is introduced into both operation chambers 2b and 3b. If the two booster pistons 4, 6 advance slightly because of the air pressure difference thus formed, the valve element 31 is seated on the second valve seat 30₂ so that the control valve 34 is located in the initial neutral state. The negative pressure diluted by air is held in both operation chambers 2b, 3b so that the negative pressure booster B falls into the quiescent state as shown in FIG. 1.

In such a quiescent state, as described above, since the movable core 21 is opposite to the fixed core 18 with a gap g sufficient to invalidate the magnetic force, even if a current is passed through the solenoid 16 because of any failure, the movable core 21 is not attracted to the fixed core 18 so that the control valve 34 remains in the neutral state. Therefore, erroneous operation of the booster pistons 4, 6 is avoided.

Meanwhile, as described above, at the time of normal braking, the first valve seat 30₁ which controls introduction of air is operated by the valve plunger 23 coupled with the input rod 24. At the time of urgent braking, the first valve seat 30₁ is operated by the electromagnetic auxiliary control means 53, including the solenoid 16. This permits the single first valve seat 30₁ to respond to the normal braking and urgent braking, thus contributing to simplification of the structure. In addition, since the single first valve seat 30₁ provides no invalid stroke, slight movement of the input rod 24 permits the introduction of air to be controlled properly. The response of the booster pistons 4, 6 is enhanced.

The present invention is not limited to the above embodiment and can be realized in several modifications without departing from the spirit of the invention. For example, the negative booster B can be designed in a single system having a single booster piston. Further, the stopper plate 36 of the input rod 24 and the inward flange 12a of the rear extending cylinder 12 can be eliminated. In this case, when the negative pressure booster B is quiescent, with the second valve seat 30₂ opened, communication between the operation chambers 2b, 3b and the negative chamber 2a, 3a may be held.

As described above, in accordance with the first feature of the present invention, the control valve has a valve element which is supported for to-and-fro movement within a prescribed stroke to an input member and spring-biased to the side of the retreating limit thereof. When the valve element advances toward the valve cylinder, the control valve interrupts communication between the operation chamber and the negative pressure chamber to increase the communication opening degree between the operation chamber and air in accordance with the degree of advancement. When the valve element retracts from the valve cylinder, the control valve interrupts communication between the operation chamber and air to increase the communication opening degree between the operation chamber and negative pressure chamber in accordance with the degree of retraction. Further, the electromagnetic auxiliary control means includes the fixed core fixed to the valve cylinder, solenoid mounted on the fixed core and movable core coupled with the valve element to be opposite to the fixed core. When the solenoid is excited while the input member advances, the electromagnetic auxiliary control means operates the movable core so that the advancement quantity of the valve element for the valve cylinder exceeds that of the valve element by the input member. Therefore, a single valve element permits introduction of air into the operation chamber to be controlled in response to the normal braking and urgent braking, thus leading to simplification of the structure. Further, since the valve element does not provide an invalid stroke, the response of the booster piston can be enhanced.

In accordance with the second feature of the present invention, between the fixed core and movable core, a gap is provided which impedes the movable core from being operated even when the solenoid is excited when the input member is located at the retraction limit for the valve cylinder and the valve element is located at the retraction limit for the input member. For this reason, even if the solenoid is excited because of any failure while the input member is not operative, the movable core is not attracted to the fixed core so that erroneous operation of the valve element is prevented.

In accordance with the third feature of the present invention, the input member is connected to the input return spring which provides spring force capable of separating the movable core from the fixed core through the input member even in a state where the solenoid is excited. Therefore, when the input member is released from the urgent braking, even if the excitation of the solenoid is not canceled because of any failure, the valve element as well as the movable core is retracted by the input return spring force, thereby canceling the operation of the booster piston.

Having thus described my invention, what I claim as new and desire to secure by Letters Patent is as follows:

1. In a negative pressure booster equipped with an electromagnetic auxiliary control means comprising:

a booster shell accommodating booster pistons which partition an inside of the booster shell into front negative pressure chambers communicating with a negative pressure source and rear operation chambers;

a valve cylinder slidably supported on the rear wall of the booster shell and connected to the booster pistons;

an input member movable to-and-fro, a control valve for switching communication of the operation chambers with the negative pressure chambers and with air, and an electromagnetic auxiliary control means for increasing an operation quantity of the control valve when it is excited while the input member advances within the valve cylinder;

said control valve having a single valve element which is supported for to and fro movement within a prescribed stroke to the input member and spring-biased to a side of a retraction limit thereof, and when the single valve element advances toward the valve cylinder, the control valve interrupts communication between the operation chambers and the negative pressure chambers to increase the communication opening degree between the operation chambers and air in accordance with a degree of advancement, and when the single valve element retreats from the valve cylinder, the control valve interrupts communication between the operation chambers and air to increase the communication opening degree between the operation chambers and negative pressure chambers in accordance with a degree of retraction;

the electromagnetic auxiliary control means including a fixed core fixed to the valve cylinder, a solenoid mounted on the fixed core, and a movable core coupled with the valve element to be opposite to the fixed core, such that when the solenoid is excited while the input member advances, the electromagnetic auxiliary control means operates the movable core so that the advancement quantity of the valve element for the valve cylinder exceeds that of the valve element by the input member; and a gap between the fixed core and the movable core such that when the solenoid is excited and the input member remains non-excited, the valve element remains in a closed position.

2. A negative pressure booster equipped with an electromagnetic auxiliary control means according to claim 1, wherein the gap provided between the fixed core and movable core impedes the movable core from being operated, when the solenoid is excited the input member is located at the retraction limit for the valve cylinder and the valve element is located at the retraction limit for the input member.

3. A negative pressure booster equipped with an electromagnetic auxiliary control means according to claim 2, wherein the input member is connected to an input return spring which provides spring force capable of separating the movable core from the fixed core through the input member even in a state where the solenoid is excited when the input member is located at its retracted position.

4. A negative pressure booster, comprising:
a booster shell;
a plurality of operation chambers positioned within said booster shell;
a plurality of negative pressure chambers positioned within said booster shell and separated from said plurality of operation chambers;
booster pistons separating said plurality of operation chambers from said plurality of negative pressure chambers, said booster pistons capable of a reciprocating motion;
a valve cylinder coupling said booster pistons;
a housing being positioned in said valve cylinder, said housing housing a solenoid;
a fixed core being fixed at an end of said housing;
a movable core having an inner peripheral surface and a rear end, said movable core being positioned proximate to and sliding with respect to said fixed core;
a valve plunger having an end and slidably fitting in the inner peripheral surface of said movable core;
an input rod connecting to the end of said valve plunger, said input rod capable of a reciprocating movement with respect to said fixed core and adapted to being operated by a braking pedal of a vehicle;
a first valve seat integrally formed on the rear end of said movable core;
a second valve seat formed integrally to said valve cylinder and surrounding said first valve seat;
a valve element opposing said first and second valve seats, said valve element being movable within said valve cylinder;
a valve spring biasing said valve element toward said first and second valve seats;
communicating paths communicating between said plurality of operation chambers and said plurality of negative pressure chambers;
communicating port communicating between said communication paths and said first and second valve seats;
a valve seat return spring urging said first valve seat toward said valve element, said valve seat return spring having a force at a magnitude larger than that of said valve spring for biasing said valve element forward, wherein said movable core is held at a retraction limit by the force of said valve seat return spring thereby defining a gap between said fixed core and said movable core, said gap invalidates an attracting force which is generated in said fixed core and said movable core when said solenoid is excited such that said valve element remains in a closed position.

5. The negative pressure booster of claim 4, further comprising an engagement ring press fitting said fixed core to said valve cylinder.

6. The negative pressure booster of claim 4, further comprising a partition plate positioned within said booster shell forming a front shell chamber and a rear shell chamber.

7. The negative pressure booster of claim 6, wherein said valve cylinder is slidably supported to said partition plate.

8. The negative pressure booster of claim 4, further comprising opposite steps formed at the rear end of said movable core, said opposite steps limiting a sliding stroke of said movable core.

9. The negative pressure booster of claim 4, wherein when the valve element is seated on said first and second valve seats, said plurality of operation chambers are not communicated with said plurality of negative pressure chambers and air.

10. The negative pressure booster of claim 4, wherein when said first valve seat is advanced toward said fixed core, said first valve seat disengages from said valve element and one of said communicating ports communicates with air such that the air passes over said first valve seat and is introduced into said plurality of operation chambers via said one of said communicating ports whereby said booster pistons advance against a force of said valve seat return spring.

11. The negative pressure booster of claim of claim 10, wherein when said input rod stops advancing, said valve element is seated on said first valve seat so that the air is not provided into said plurality of operation chambers thereby stopping advancement of said booster pistons.

12. The negative pressure booster of claim 11, wherein:
said valve element is movable in a reciprocating movement toward and away from said fixed core within a prescribed stroke, said valve element is spring-biased to from said fixed core; and
when said valve element advances toward said valve cylinder, said first and second valve seats and said valve element interrupt communication between said plurality of operation chambers and said plurality of negative pressure chambers to increase a communication opening degree between said plurality of operation chambers and the air.

13. The negative pressure booster of claim 4, further comprising an input return spring connecting to said input rod, wherein said input return spring provides spring force capable of separating said movable core from said fixed core through said input rod when said solenoid is excited, whereby an operation of said booster pistons are canceled when there is a failure of said solenoid.

14. In a negative pressure booster equipped with an electromagnetic auxiliary control means comprising:
a booster shell accommodating booster pistons which partition an inside of the booster shell into front negative pressure chambers communicating with a negative pressure source and rear operation chambers;
a valve cylinder slidably supported on the rear wall of the booster shell and connected to the booster pistons;
an input member movable to-and-fro, a control valve for switching communication of the operation chambers with the negative pressure chambers and with air, and an electromagnetic auxiliary control means for increasing an operation quantity of the control valve when it is excited while the input member advances within the valve cylinder;
said control valve having a valve element which is supported for to and fro movement within a prescribed stroke to the input member and spring-biased to a side of a retraction limit thereof, the valve element including an inwardly flanged portion and the input member defines an annular groove engaging with the inwardly flanged portion so that the valve element is slidable within the prescribed stroke, when the valve element advances toward the valve cylinder, the control valve interrupts communication between the operation chambers and the negative pressure chambers to increase the communication opening degree between the operation chambers and air in accordance with a degree of advancement, and when the valve element retreats from the valve cylinder, the control valve interrupts communication between the operation chambers and air to increase the communication opening degree between the operation chambers and negative pressure chambers in accordance with a degree of retraction; and
the electromagnetic auxiliary control means including a fixed core fixed to the valve cylinder, a solenoid mounted on the fixed core, and a movable core coupled with the valve element to be opposite to the fixed core, such that when the solenoid is excited while the input member advances, the electromagnetic auxiliary control means operates the movable core so that the advancement quantity of the valve element for the valve cylinder exceeds that of the valve element by the input member.

15. The negative pressure booster of claim 14, wherein the input member includes a first flanged portion and a second flanged portion cooperatively defining the annular groove.

16. The negative pressure booster of claim 15, wherein the first flanged portion is formed by a ring member attached to the input member.

* * * * *